C. OAKFORD.
RESILIENT WHEEL.
APPLICATION FILED SEPT. 12, 1916.
1,256,249.
Patented Feb. 12, 1918.
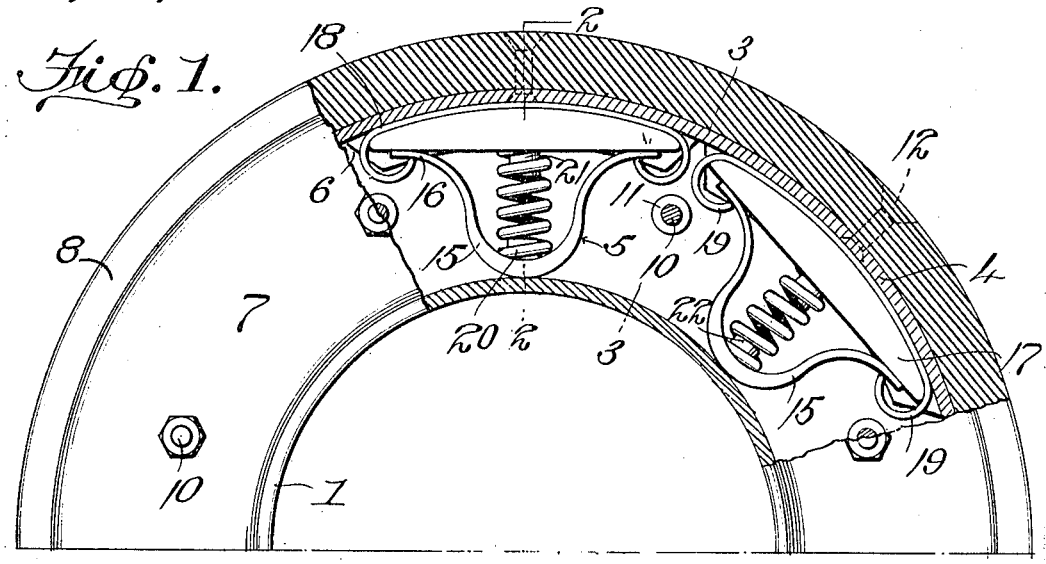
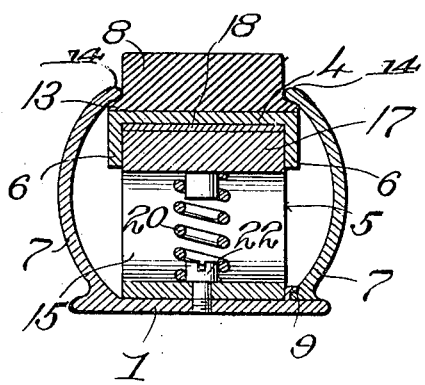
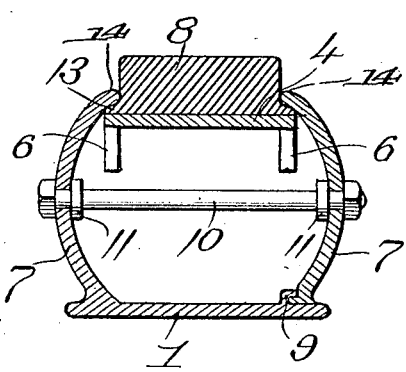
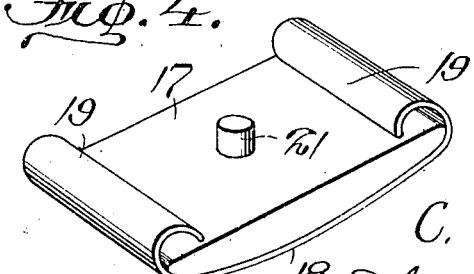
Witnesses
Inventor
C. Oakford,
By
Attorneys

UNITED STATES PATENT OFFICE.

CHARLES OAKFORD, OF PLANT CITY, FLORIDA.

RESILIENT WHEEL.

1,256,249.     Specification of Letters Patent.     Patented Feb. 12, 1918.

Application filed September 12, 1916. Serial No. 119,706.

*To all whom it may concern:*

Be it known that I, CHARLES OAKFORD, a citizen of the United States, residing at Plant City, in the county of Hillsborough, State of Florida, have invented certain new and useful Improvements in Resilient Wheels; and I do hereby declare the following to be a full, clear, and exact description of the invention, such as will enable others skilled in the art to which it appertains to make and use the same.

This invention relates to resilient wheels and has particular reference to a spring wheel construction.

The object of the invention is to provide a practical and inexpensive spring wheel which is particularly adapted to be used upon motor vehicles of various types and which will respond efficiently to the changes in load and to the irregularities in the road.

A further object of the invention is to provide a compactly and strongly assembled spring wheel structure in which the parts are secured against accident and wear.

With the above objects in view and such other objects as may hereinafter appear, my invention will now be fully set forth and described, reference being had to the accompanying drawings.

In the drawings:—

Figure 1 is a side elevation of a spring wheel embodying my invention, a portion of the casing being broken away to disclose the spring element, Fig. 2 is a section on line 2—2 of Fig. 1, Fig. 3 is a section on line 3—3 of Fig. 1, and Fig. 4 is an enlarged detail view of one of the spring elements.

Referring more particularly to the drawings, 1 is an inner rim removably supported by the usual wheel (not shown). An outer rim 4 is spaced from the rim 1 by means of the spring elements which are generally designated by 5, the rim 4 consisting of a spring band which carries the marginal interrupted inturned flanges 6. The rim 1 carries the sides or annular webs 7 which protect the spring elements 5 and also inclose the rim 4 and a solid tire 8. One of the sides 7 is formed as an integral marginal flange of the rim 1 while the other is removable, a locking flange 9 being formed upon the upper surface of the rim 1 to receive a foot of the side 7 in abutted relation and bolts 10 passed through the sides 7 securely locking them together. The bolts 10 may be shouldered as at 11 in order to prevent the sides 7 from being brought too closely together.

The solid tire 8 rests upon the outer surface of the rim 4 and is secured thereto by means of the rivets 12 in a well known manner. The lower portions of the sides of the tire 8 are formed into the offset beads or flanges 13 which also rest upon the rim 4, and are clamped below the free inturned edges 14 of the sides 7 so that the latter not only aid in securing the tire 8 in position, but furthermore, the beads 13 serve as cushioned stops to the outward play of the rim 4.

Each of the spring elements 5 consists of a bowed leaf-spring 15 which has its intermediate portion thickened to be bolted to the rim 1 and has its ends outturned to form the tongues 16. Associated with the bowed spring 15 is a block 17 whose outer surface conforms to the curvature of the inner surface of the rim 4, the block being formed to lie between the sides 6 of the rim 4. The block 17 is covered upon its outer side with a metallic strip 18 whose ends are turned over the end of the block 17 and are continued to form the inturned clips 19, into which the ends 16 of the bowed-spring 15 projects. the relationship of the ends 16 being a slidable one so that as the bowed spring 15 expands or contracts, the ends 16 are free to ride below the inturned clips 19. Interposed between the secured portion of the spring 15 and the lower face of the block 17 is a coil spring 20, a stud 21 upon the block 17 and a stud 22 upon the bowed spring 15 holding the ends of the spring 20 in fixed relation. The stud 22 may be the head of the bolt or screw which secures the spring 15 to the rim 1. The spring elements 5 are interposed between the rims 1 and 4 in substantially abutted relation, so that the space between the rims is substantially filled by the spring elements, and since the latter are fully protected by the sides or webs 7, the spring wheel has substantially the appearance and all of the advantages of a pneumatic tire. When the spring elements operate under pressure or sudden jar, the tire 8, with the compression of the spring elements 5 rides between the free edges of the flanged sides or webs 7 and also when the pressure is relieved, the spring elements expand until the beads 13 again rest below the inturned free edges of the sides.

It should be noted that the parts are readily accessible and easily assembled and since they are also of comparatively simple form and small number, the wheel can be properly constructed with comparatively low cost. Furthermore, all of the jars and vibrations which it is necessary for the vehicle wheel to take up are efficiently compensated for in the new construction which has been hereinbefore described.

What I claim is:—

In a resilient wheel, the combination with an inner rim and an outer rim, spring elements carried by said inner rim and supporting the outer rim, said spring elements each consisting of a bowed spring secured to the inner rim, a block having one side conformed to the inner face of the outer rim, a metal covering for the block having its ends inturned to provide clips in which the ends of the bowed spring are slidably received and a coil spring interposed between the block and the bowed spring.

In testimony whereof, I affix my signature, in the presence of two witnesses.

CHARLES OAKFORD.

Witnesses:
A. M. RAY,
A. M. TRASK.

Copies of this patent may be obtained for five cents each, by addressing the "Commissioner of Patents, Washington, D. C."